(12) United States Patent
Bart et al.

(10) Patent No.: US 9,635,224 B2
(45) Date of Patent: Apr. 25, 2017

(54) PAN AND TILT CAMERA WITH ROBOTIC MOVEMENT

(71) Applicant: Alarm.com Incorporated, Vienna, VA (US)

(72) Inventors: Gary Bart, Weston, FL (US); Mehmet Erdal Caglayan, Fort Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 139 days.

(21) Appl. No.: 14/689,852

(22) Filed: Apr. 17, 2015

(65) Prior Publication Data

US 2015/0304532 A1   Oct. 22, 2015

Related U.S. Application Data

(60) Provisional application No. 61/981,227, filed on Apr. 18, 2014.

(51) Int. Cl.
*H04N 5/225* (2006.01)
*H04N 5/232* (2006.01)

(52) U.S. Cl.
CPC ......... *H04N 5/2252* (2013.01); *H04N 5/2254* (2013.01); *H04N 5/232* (2013.01); *H04N 5/23296* (2013.01); *Y10S 901/09* (2013.01)

(58) Field of Classification Search
None
See application file for complete search history.

*Primary Examiner* — Stephen Coleman
(74) *Attorney, Agent, or Firm* — Fish & Richardson P.C.

(57) ABSTRACT

A pan and tilt camera is described that comprises a cylindrical base. The pan and tilt camera comprises a tubular body having a top edge, a bottom edge, and a tubular side, the tubular side of the cylindrical body being transected at an angle to define a lower body and an upper body. The lower body has a bottom edge that corresponds to the bottom edge of the tubular body and a top edge corresponding to the angle of transection. The upper body has a bottom edge that corresponds to the angle of transection and a top edge that corresponds to the top edge of the tubular body. The pan and tilt camera comprises a cylindrical housing having a bottom edge that is movably attached to the top edge of the upper body. The cylindrical housing is coupled to a camera component.

20 Claims, 11 Drawing Sheets

PAN AND TILT CAMERA WITH ROBOTIC MOVEMENT

CROSS-REFERENCE TO RELATED APPLICATIONS

The present application claims the benefit of U.S. Provisional Application No. 61/981,227, filed Apr. 18, 2014, which is incorporated herein by reference in its entirety for all purposes.

TECHNICAL FIELD

This application relates to a pan and tilt camera device.

BACKGROUND

A pan-tilt-zoom camera is a camera that is capable of remote directional and zoom control. The combination of the movement of the camera in a horizontal plane, or panning, and movement of the camera in a vertical plane, or tilting, enables the camera to have a broad and controlled field of view. Such cameras are often used in surveillance and monitoring applications.

SUMMARY

An apparatus and methods are described for a pan and tilt camera with robotic motion that is configured to provide monitoring and surveillance.

Implementations of the described apparatus and methods may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description of the drawings.

DETAILED DESCRIPTION

Figure 1A:
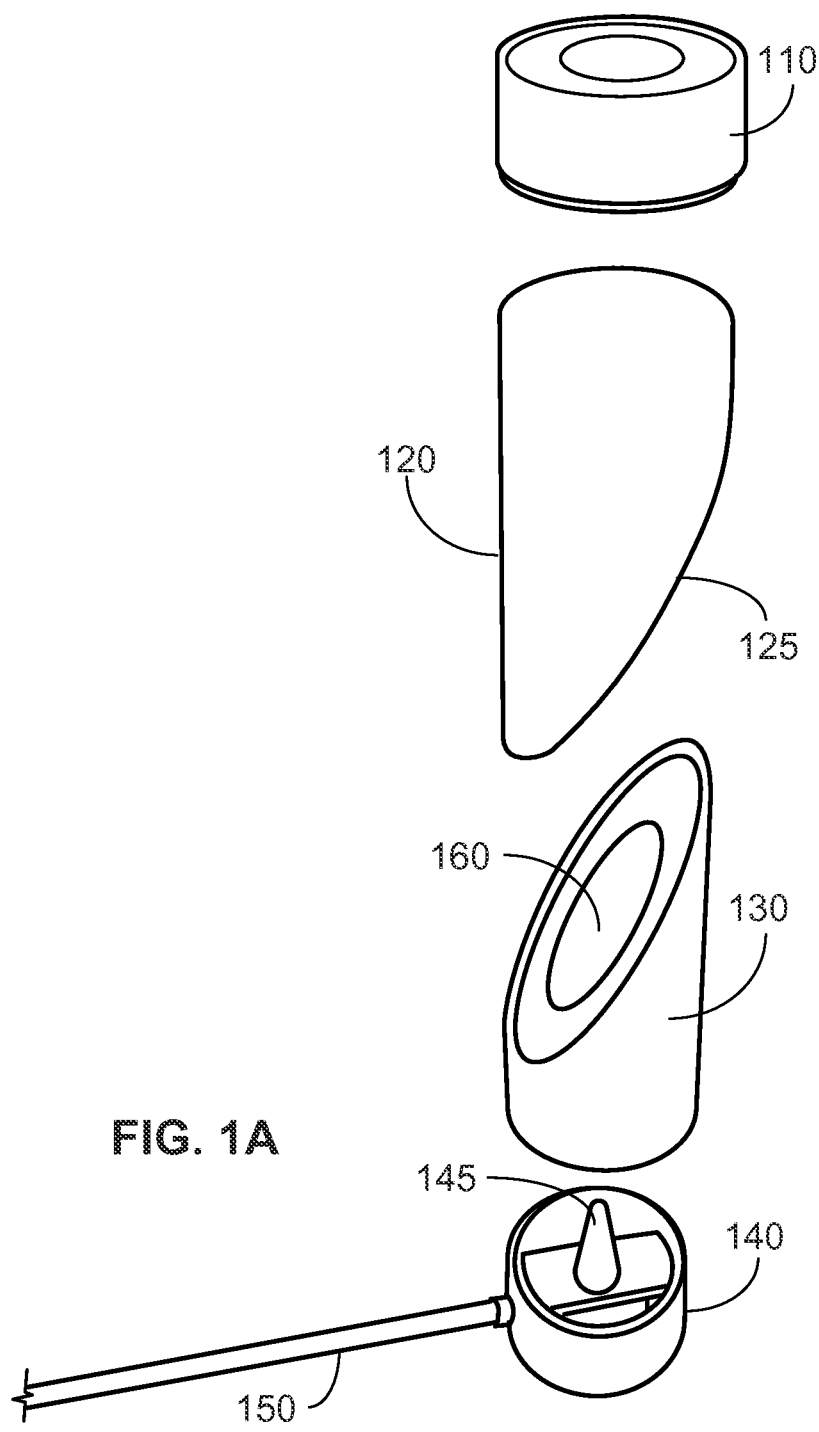
FIG. 1A is an exploded view of a pan and tilt camera.

A device and techniques are described for a pan and tilt camera with robotic movements. In some implementations, the pan and tilt camera is a pan, tilt, and zoom (PTZ) camera that is usable for monitoring and surveillance. For example, the pan and tilt camera can be used as a surveillance camera at a home, business, vacation, or other property. The described device and techniques can perform continuous panning and/or tilting in a particular direction. Thus, the pan and tilt camera can view an object moving continuously around the camera without the need to reverse pan or tilt directions to return to an initial starting position before continuing to pan or tilt in the original direction. Such reversing is typically required of pan and tilt cameras, as these cameras are typically limited by the wired connections internal to the product. The pan and tilt camera described herein provides a compact device that is capable of performing surveillance and monitoring operations without the rotational limitations of prior designs, while also providing an alternative to traditional pan and tilt cameras that is more visually appealing and is quieter during operation.

In some implementations, the pan and tilt camera comprises four outer sections that cumulatively form a cylindrical structure. These sections include a base, a lower body, an upper body, and a lens housing. The sections of the pan and tilt camera base, upper and lower bodies, and lens housing may be formed in any number of materials, such as any plastic, metal, alloy, composite material, ceramic material, or other suitable material. In some implementations, the pan and tilt camera may feature a fixed base, where the fixed base is connected to a power cable functioning to provide a power source to the camera. The base can be of a cylindrical or disk-like shape, having a flat bottom that enables the pan and tilt camera to be mounted to or sit on a surface or other structure, such as a ceiling, wall, roof, window sill, floor, table, etc. Connected to the base is the lower body, which is, in turn, in contact with the upper body. The lower and upper bodies are formed such that the two bodies appear to form a single cylinder that has been transected at an angle. Attached to the upper body, opposite the lower body, is the lens housing, which includes the components enabling the pan and tilt camera to perform monitoring activities. For example, the lens housing can feature a complementary metal-oxide-semiconductor (CMOS) image sensor and accompanying circuitry that together are capable of capturing images or video. The camera can pan, i.e., rotate horizontally about a vertical axis, based on the lower body rotating in a clockwise or counterclockwise direction with respect to the fixed base. The camera can tilt, i.e., move in a direction that is about an axis having a horizontal component, based on the upper body rotating with respect to the lower body. Since the upper and lower bodies are the transected portions of the cylindrical structure of the camera, the upper body rotates about an axis that is perpendicular to the transection resulting in an arc-like movement having components in both the vertical and horizontal directions. The lens housing connected to the upper body opposite the lower body includes a sensor device that is capable of capturing images or video from the environment of the camera.

Figure 1B:
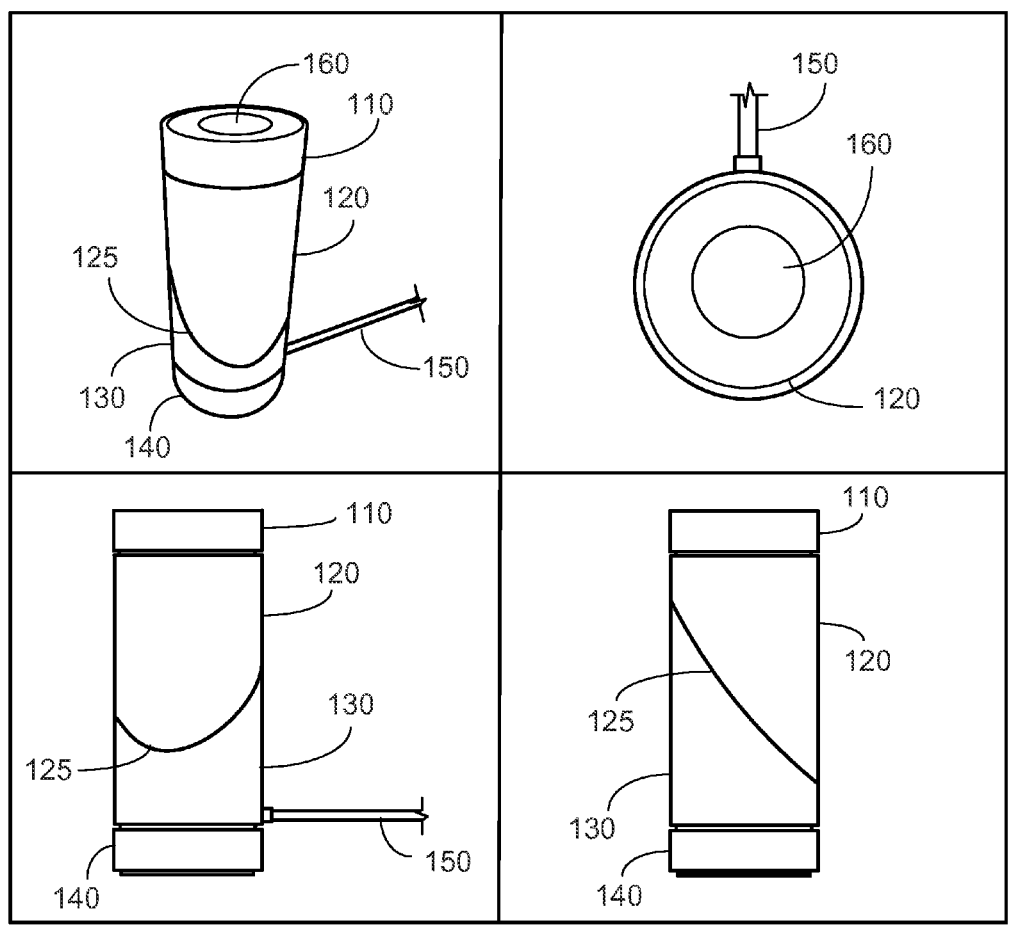
FIG. 1B depicts a pan and tilt camera.

FIGS. 1A and 1B illustrate examples of a pan and tilt camera according to various embodiments. The camera of FIGS. 1A and 1B, as shown, has a cylinder-like structure that comprises four outer sections: a base 140, lower body 130, upper body 120, and lens housing 110. The base is also connected to a power cable 150, and features a slip ring 145 for coupling the electrical power supplied by the power cable 150 to the functional components of the camera without the need for a wired connection.

The cylindrical structure is transected across its diameter perpendicular to the longitudinal axis to form the base 140 of the camera. For example, the base 140 shown in FIG. 1A is a cylindrical or disk-like structure that forms the bottom of the cylindrical camera structure (given the orientation of the camera shown in FIG. 1A). In some implementations, the base 140 may have a height that is approximately twenty percent of the total height of the cylindrical camera structure, with the other eighty percent being accounted by the lower body 130, upper body 120, and lens housing 110. The base 140 is designed to be a fixed component of the camera structure, such that the base 140 is stationary while the camera is performing pan or tilt movements. Additionally, the base 140 may feature a fixture configured to connect to a power cable 150 for providing electrical power to the camera. For example, the base 140 may feature an outlet or plug that allows a power cable 150 to be connected to the base 140, or a power cable 150 may be permanently connected to the base 140. The base shown in FIG. 1A further features a slip ring 145 configured to connect the power connection from the attached power cable 150 to the other components of the pan and tilt camera. By using a slip ring connection as opposed to a wired connection from the power cable 150 to the components of the pan and tilt camera, the camera can perform continuous panning about the vertical axis, without limitations caused by twisting or other issues associated with a corded connection from the base 140 to the components of the pan and tilt camera. Additionally, while shown in FIG. 1A as the slip ring 145, other rotational electrical connections may be used, such as a commutator, pancake slip ring, or other electrical connection that allows for continuous rotation of the pan and tilt camera without loss of electrical contact.

Additionally, in some implementations, the power cable 150 can be configured to carry other electrical signals in addition to or in lieu of electrical power. For example, the power cable 150 may be configured to transmit image or video data obtained by a camera component of the pan and tilt camera, may be configured to transmit control signals for controlling the pan and tilt movements of the camera or control signals for controlling the camera component of the pan and tilt camera. Other data may be transmitted by the power cord 150, such as information specifying control parameters or image capture parameters. For instance, information transmitted by the power cord 150 may be provided to a controller associated with the pan and tilt movements of the camera, where the information specifies a rate of movement or acceleration of movement of the pan and tilt camera. Similarly, information transmitted by the power cord 150 may be provided to a controller associated with the camera component of the pan and tilt camera, such as information specifying an image capture rate, image quality, or other parameters relating to the operation of the camera component.

In other instances, the pan and tilt camera may be a wireless device that utilizes battery power and/or transmits data over one or more wireless connections. In these implementations, the power cord 150 may not be a necessary component of the pan and tilt camera, as the camera can operate using battery power provided by a battery component associated with the pan and tilt camera, or may transmit control data, data specifying operating parameters for the pan and tilt camera or its camera component, or image or video data captured by the camera component over one or more wireless networks, such as one or more Bluetooth, Wi-Fi, Z-Wave, ZigBee, HomePlug (Ethernet over powerline) or other wireless connections. Alternatively, the power cord 150 may be configured to transmit either data only or data and electrical power, such as when the power cord 150 is one of an Ethernet, USB, or other wired connection.

The lower body 130 is movably connected to the base 140, such that cylindrical structure of the camera is transected perpendicular to the longitudinal axis to form the bottom edge of the lower body 130. The bottom of the lower body 130 then connects to a top area of the base 140, for example by the outer circumference of the lower body 130 being connected to the outer circumference of the base 140 and capable of rotation with respect to the base 140. Furthermore, the lower body 130 is transected at an area approximately corresponding to the center of the cylindrical structure of the camera to form the top of the lower body 130. Described another way, the upper and lower bodies 130, 120 are formed from a tubular structure that is movably connected at its bottom edge to the base 140. The tubular side of the tubular structure is transected at an angle 125 across its diameter, thereby forming the lower and upper bodies 120, 130 of the camera, where the transection forms the top edge of the lower body 130 and the bottom edge of the upper body 120. In some implementations, the transection angle 125 between the horizontal axis, or the bottom edge of the lower body 130, and the top edge of the lower body 130 may be in the range of 45 degrees to 55 degrees, or may be different depending upon the requirements of the application. Generally, the larger the angle 125 of the transection, the greater the range of motion of the pan and tilt camera in the tilt direction. In operation, the lower body 130 of the pan and tilt camera enables the camera to pan, based on the lower body 130 of the camera rotating in a clockwise or counterclockwise fashion about the vertical axis that passes through the middle of the lower body 130 and is perpendicular to the bottom edge of the lower body 130.

The upper body 120 is in contact with the lower body 130 of the described pan and tilt camera. As shown, the bottom edge of the upper body 120 is formed by transecting the cylindrical camera structure at an angle 125, such that the upper body 120 and lower body 130 can align to form a contiguous cylinder structure as shown in FIG. 1B. In some instances, the angle 125 between the horizontal axis, or the top edge of the upper body 120, and the bottom edge of the upper body 120 may be in the range of 45 to 55 degrees, or may be different depending upon the requirements of the application, as discussed above. The top edge of the upper body 120 is formed parallel to the horizontal, such that the cylindrical structure of the camera has been transected across its diameter perpendicular to the longitudinal axis. Described another way, the upper and lower bodies 120, 130 of the pan and tilt camera are formed from a tubular structure, where the top edge of the tubular structure corresponds to the top edge of the upper body 120. In operation of the pan and tilt camera, the upper body 120 of the camera rotates relative to the lower body 130 in an arc that corresponds to the angle 125 by which the structure forming the upper body 120 and lower body 130 are transected. Such a rotation about the axis perpendicular to the angle 125 of the transection includes components in both the horizontal and vertical directions. In some implementations, the upper body 120 rotates about an axis that is perpendicular to the angle 125 of the transection and that passes through a point lying in the plane of the transection that is located in the middle of the transection.

To achieve horizontal panning and vertical tilting of the pan and tilt camera, a combination of movements occur, in which the upper body 120 of the camera is rotated about the axis perpendicular to the angle 125 of the transection to achieve the proper tilt, and the lower body 130 of the camera is rotated about the axis perpendicular to the bottom edge of the lower body 130 to achieve the proper pan, thereby aiming a camera component of the pan and tilt camera at the desired target. In some applications, a controller associated with the camera may be configured to allow for a desired motion of the camera. For example, a controller or control logic associated with the pan and tilt camera may be configured with an algorithm that enables the camera to move in a desired fashion or to achieve a desired field of view, such as a desired tilt motion, pan motion, tilt or pan position, or combination thereof. In other examples, the camera may have other features that enable the precise movement and aiming of the camera, for instance, a set of gears that cause the camera to move in a predetermined fashion to allow for pan and tilt in a desired direction. In still other examples, the pan and tilt camera may be physically manipulated to achieve a desired field of view, for example based on an installer or user of the camera physically moving the upper and lower bodies 120, 130 of the pan and tilt camera to the proper configuration.

Attached to the top of the upper body 120 is the lens housing 110 of the pan and tilt camera. The lens housing 110, as described, can feature one or more camera components, such as one or more video cameras, still cameras, infrared cameras, night vision cameras, or other devices capable of receiving images or video. In some implementations, the camera component can be a digital camera that utilizes a complimentary metal-oxide-semiconductor (CMOS) image sensor, a charge coupled device (CCD) image sensor, a backside illuminated CMOS (BSI-CMOS) image sensor. For example, the camera component can be a digital single-lens reflex (dSLR) or other digital camera device. The camera component can also include non-digital still image or video cameras or still image or video cameras recording to a magnetic tape such as a video home system (VHS) video tape, or other medium. In some instances, the lens housing 110 can feature other electronics and circuitry required to operate the one or more camera components and/or electronics or circuitry required to operate other functions of the pan and tilt camera, such as electronics associated with controlling the pan and tilt movements of the camera. Furthermore, in some implementations, the lens housing 110 of the cylindrical camera structure can feature one or more other sensors, such as one or more microphones, motion sensors, contact sensors, light sensors, other environmental sensors, or other sensors capable of performing monitoring or surveillance functions.

As shown in FIGS. 1A and 1B, the lens housing 110 of the pan and tilt camera can have a cylindrical or disk-like shape, although other shapes for the lens housing 110 may be used without affecting the functionality of the pan and tilt camera. In some implementations, the lens housing 110 is movably connected to the upper body 120 such that the top edge of the upper body 120 and the bottom edge of the lens housing 110 as shown in FIG. 1A are in contact, where the bottom edge of the lens housing 110 and top edge of the upper body 120 are perpendicular to the longitudinal axis passing through the camera when it is in the position shown in FIG. 1B. The lens housing 110 may be movable with respect to the upper body 120, such that the lens housing 110 can rotate clockwise or counterclockwise about the longitudinal axis passing through the middle of the lens housing 110 that is perpendicular to the bottom edge of the lens housing 110. In some implementations, the lens housing 110 may be connected to the upper body 120 where the top edge of the tubular side of the upper body 120 contacts the bottom edge of the lens housing's 110 outer circumference. The lens housing 110 may be loosely coupled to the upper body 120 such that the lens housing 110 moves with movement of the upper body 120, and such that the lens housing 110 may rotate relative to the upper body 120 along the axis passing through the middle of the lens housing 110 that is perpendicular to the bottom edge of the lens housing 110. Furthermore, as shown in FIGS. 1A and 1B, the top of the lens housing 110 may be perpendicular to the longitudinal axis of the cylindrical camera structure. In other examples, the top of the lens housing 110 can have a different shape, such as being rounded or spherical, or any other shape so long as the lens housing is capable of housing the camera component, of rotating with respect to the upper body 120 about the axis perpendicular to the bottom edge of the lens housing that passes through the middle of the lens housing, and if being connected to the upper body 120 such that the lens housing 110 moves with movements of the upper body 120. The lens housing 110 may feature an opening on the top, such as the circular aperture shown in FIG. 1A, that allows a camera device within the lens housing 110 to film in a direction perpendicular to the top surface of the lens housing 110, e.g., along the vertical axis when the camera is in the position shown in FIG. 1B.

In some implementations, the lens housing 110 of the camera may feature on or more heat sinks that are included to dissipate heat produced by the components of the pan and tilt camera. Since, in some implementations of the described camera, the body of the camera has a design that includes very little ventilation, for example, the body can be a solid object without perforations or vents, the camera can be subject to overheating. The presence of one or more motors in the body of the camera, one or more sensors and their supporting electronics, and other electrical components, generate heat that must be dissipated to avoid the camera overheating and become non-functional (e.g., by the camera entering a safety mode to avoid overheating, or by one or more components of the camera failing due to overheating). To combat this problem, the pan and tilt camera may include a metal band that surrounds the lens housing 110, where a main circuit board of the camera may be located. Such a circuit board may feature components relating to the movements of the pan and tilt camera, as well as components associated with one or more camera devices, image sensors, or other sensors, and may therefore generate considerable heat under operation. The metal band may enable dissipation of this heat. For example, the metal band may dissipate heat by being directly connected to the high heat generating components on the main circuit board, thereby serving as a heat sink. Other heat sinks may also be located within the lens housing 110, such as one or more heat sinks that comprise fins or pins for dissipating heating generated by the components of the pan and tilt camera.

As described, each of the lower body 130, upper body 120, and lens housing 110 of the pan and tilt camera shown in FIGS. 1A and 1B are capable of moving with respect to one another, with the lower body 130, upper body 120, and lens housing 110 further being movable with respect to the stationary base 140. To achieve such movements, the camera may feature one or more motors configured to control the movement of one or more sections of the camera. For example, a first motor may be configured to control rotation of the lower body 130, such that the first motor moves the lower body 130 relative to the fixed base 140 of the pan and tilt camera about the axis passing through the middle of the lower body 130 that is perpendicular to the bottom edge of the lower body 130. A second motor may be configured to control the rotation of the upper body 120 with respect to the lower body 130, for example, by driving the upper body 120 of the pan and tilt camera relative to the lower body 130 such that the upper body 120 rotates about an axis that is perpendicular to the transection that forms the bottom edge of the upper body 120. In some implementations, the motors may be electric and/or magnetic motors that are capable of moving the upper and lower bodies 120, 130 of the pan and tilt camera. The motors may utilize power received through the power cable 150 connected to the base 140 of the camera, or may utilize other power sources, such as one or more solar power sources, battery power sources, power drawn from one or more capacitors, or the like.

In some implementations, the sections of the camera may not be controlled by motors, and may instead be moved by a user physically manipulating the pan and tilt camera. For example, the user may be able to manually twist the lower and/or upper sections 120, 130 of the camera to set the plan and tilt of the camera appropriately. In such instances, the connections between the various sections of the cylindrical camera structure may be such that the camera can remain in a particular position after the user has set the position, for example, to ensure that the camera maintains the field of view set by the user. For instance, the connections between the base 140 and lower body 130, and between the lower body 130 and upper body 120 may rely on frictional forces to remain in place, or may use a locking mechanism to maintain the field of view set by the user.

As described, the lens housing 110 of the pan and tilt camera can include a camera and/or one or more other types of sensors that are configured to monitor and/or detect events or conditions at a particular location of a property. In some implementations, since the lens housing 110 containing the camera device is connected to the upper body 120, movement of the upper body 120 can alter not only the direction that the camera device is pointed, but also the orientation of the camera and therefore, the camera's field of view. For example, as the upper body 120 of the camera is rotated about the axis perpendicular to the transection, the camera moves in an arc-like motion. If the lens housing 110 is affixed to the upper body 120, this arc-like motion can cause the orientation of the camera within the lens housing 110 to also change, e.g., to become tilted or inverted with respect to the horizon.

To correct for this change in the orientation of the field of view of the camera as the camera pans and tilts, various techniques may be applied that enable for a constant orientation of the camera's field of view. For example, image processing performed on images or video captured by the camera device located in the lens housing 110 may be able to correct for a change in orientation of the camera's field of view, such that the images or video may be corrected to have the proper orientation. While this solution is relatively easy, especially given the ease of processing images output from CMOS or other digital image sensors, the solution may not be preferred, as processing the images often results in the loss of portions of the field of view of the camera device. For example, if a camera that produces rectangular images having a long dimension in the horizontal direction (e.g., parallel with the horizon) is rotated by ninety degrees, a portion of the field of view of the camera is sacrificed when the orientation of the image is corrected (e.g., in that the narrower of the rectangular dimensions of the camera device's field of view becomes the field of view of the camera along the horizon). As an alternative, and to maintain the full field of view of a particular camera component, the camera component included in the lens housing 110 may be physically moved to maintain the proper orientation of the camera despite the rotation of the upper body 120 of the cylindrical camera structure. For example, the lens housing 110 may be rotated with respect to the upper body 120 to maintain the proper orientation of the camera component included in the lens housing 110. By maintaining the proper orientation of the camera device throughout the range of movements of the pan and tilt camera, the need for additional image processing to compensate for the rotation of the images may be eliminated, and the intended field of view of the pan and tilt camera may be maintained.

Figure 2A:
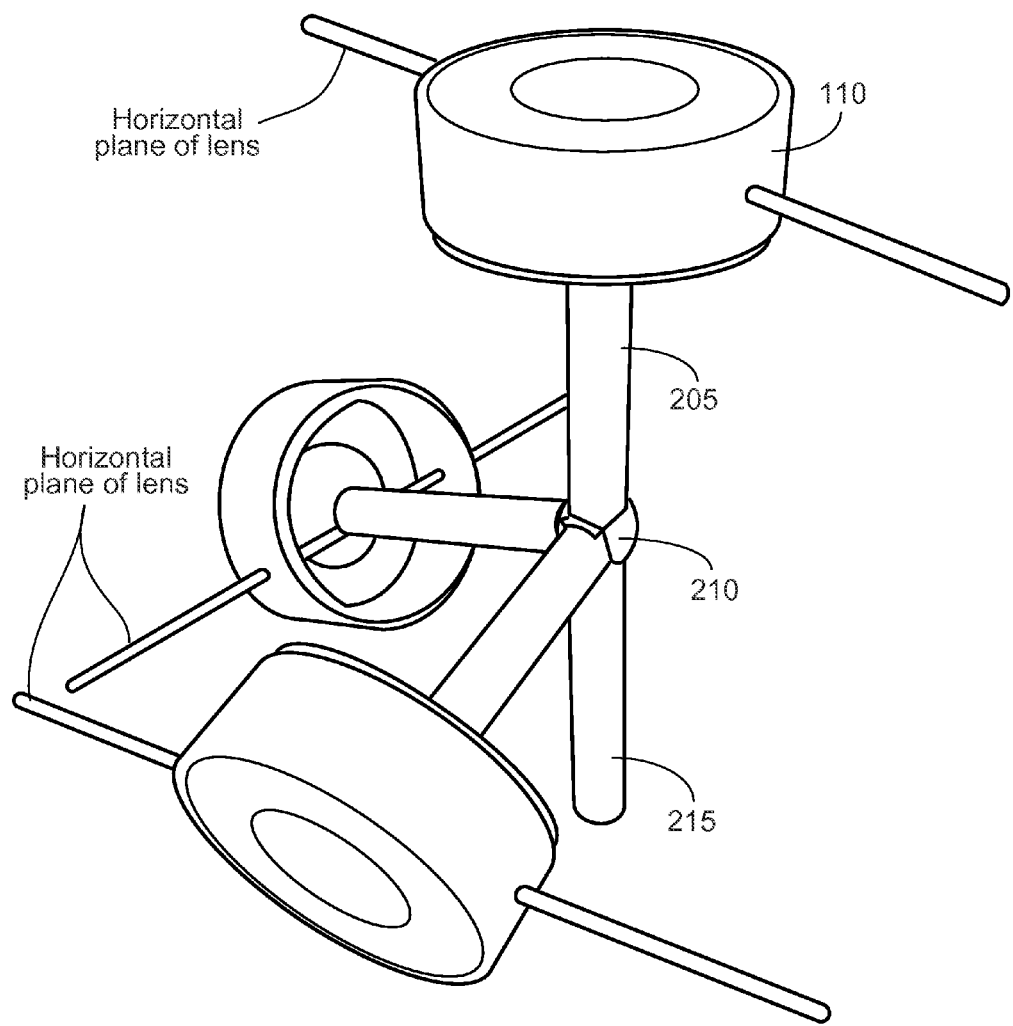
FIGS. 2A and 2B depict a mechanism for a pan and tilt camera.
Figure 2B:
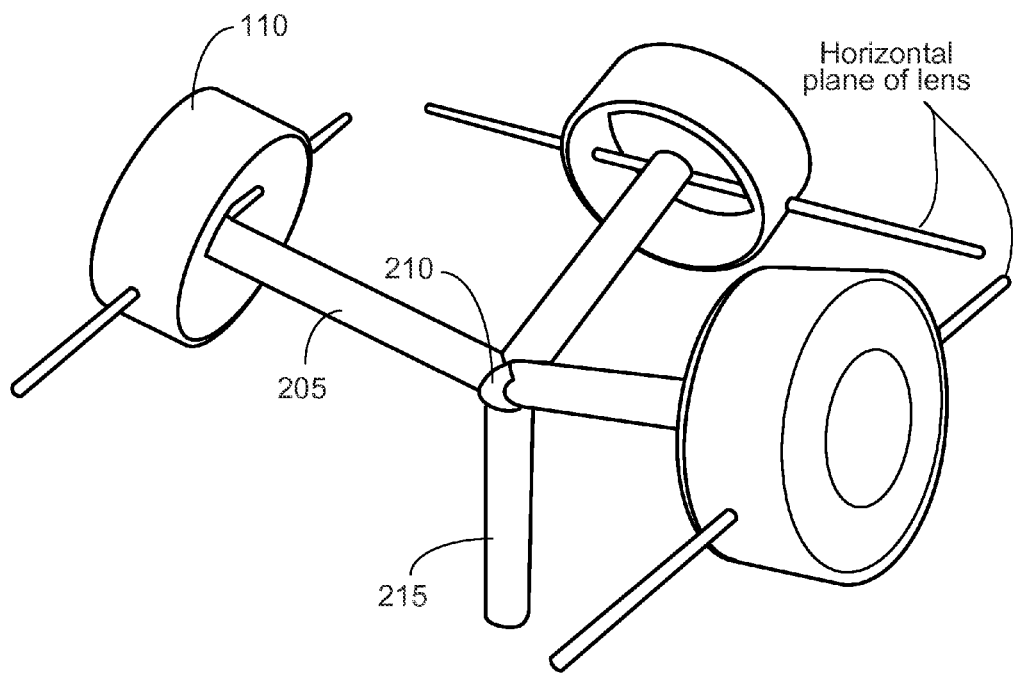

FIGS. 2A and 2B illustrate a mechanism that enables a camera component included in the lens housing 110 of the pan and tilt camera to maintain the proper image orientation throughout the range of movements of the pan and tilt camera. Specifically, the pan and tilt camera may include a set of shafts 205, 215 and a hinge 210 that connect to the lens housing 110, such that the shafts 205, 215 and hinge 210 enable the orientation of images captured by an image sensor included in the lens housing 110 to remain constant regardless of movements of the upper and lower bodies 120, 130 of the pan and tilt camera.

As shown, the lens housing 110 may be fixedly connected to an upper shaft 205, which is in turn, connected to a hinge 210. The hinge 210 may be located in the center of the cylindrical camera structure at the point where the tubular structure is transected at an angle 125 to form the lower and upper bodies 120, 130. In such a case, the length of the shaft 205 may be appropriate to allow for the fixed connection between the hinge 210 and the lens housing 110. The hinge 210 may permit the upper shaft 205 to move vertically in a tilt motion, without permitting the upper shaft 205 to rotate such that the orientation of a camera component included in the lens housing 110 would be altered. The hinge 210 is connected to a lower shaft 215 that is capable of rotating with respect to the base 140 about an axis perpendicular to the bottom edge of the lower body 130. For instance, the shaft 215 may be of a length that allows for a connection between the hinge 210 and a slip ring, hinge, swivel, or other device that connects to the base 140 and enables rotation of the shaft 215 with respect to the base 140.

The lower shaft 215, hinge 210, and upper shaft 205 allow a camera component included in the lens housing 110 to maintain its orientation regardless of movements of the upper body 120 and lower body 130 of the pan and tilt camera. Rotations of the lower body 130 or upper body 120 that cause the lens housing 110 to move with a component in the pan direction are translated by the lower shaft 215 that is able to rotate with respect to the base 140 about the axis perpendicular to the bottom edge of the lower body 130 and passing through the center of the lower body 130. Tilt movements of the lens housing 110 caused by rotations of the upper body 120 are translated by the upper shaft 205 that is capable of rotating in the tilt direction due to its connection to the hinge 210. The upper shaft 205 may be fixedly connected to both the lens housing 110 and the hinge 210, such that the lens housing 110 tilts with any tilting of the upper shaft 205, and such that the upper shaft 205 tilts with any movement of the hinge 210. The hinge joint 210 may be of any type that permits the upper shaft 205 to move in directions corresponding to the tilt movement of the pan and tilt camera. That is, the hinge 210 may permit the lens housing 110 to move in a vertical or tilt direction as the upper body 120 rotates about the axis perpendicular to the transection without enabling the lens housing 110 to rotate in a way that would affect the orientation of a camera component included in the lens house 110. The lower shaft 215 may be fixedly connected to both the hinge 210 and the slip ring or other element that enables the lower shaft 215 to rotate with respect to the base 140, such that the lens housing 110 pans with any panning of the lower shaft 215.

In some implementations, the hinge 210 may permit the upper shaft 205 to move in directions corresponding to both the pan and the tilt of the camera, for example, by enabling the upper shaft 205 to rotate about the axis parallel to the bottom edge of the lower body 130 of the pan and tilt camera and also rotate about the axis perpendicular to the bottom edge of the lower body 130. In such an implementation, the lower shaft may be fixedly attached to both the base and the hinge 210, such that the lower shaft 215 will not move with any movements of the upper or lower bodies 120, 130. In such an instance, movements of the upper body 120 or lower body 130 in either the pan direction or the tilt direction will be translated to the upper shaft 205 and the hinge 210.

In operation, the lower body 130 and upper body 120 of the pan and tilt camera can move freely about the central shafts 205, 215 and hinge 210 that connect the base 140 to the lens housing 110. Thus, as the lower body 130 of the pan and tilt camera is rotated to enable panning of the camera, and as the upper body 120 of the pan and tilt camera is rotated to enable tilting of the camera, the lens housing 110 of the camera may be guided by the shafts 205, 215 and hinge 210 to maintain a constant orientation of the lens housing 110, e.g., an orientation that enables images captured by a camera device in the lens housing 110 to maintain the same orientation relative to the horizontal. In effect, the upper body 120 as it moves exerts forces on the lens housing 110 at the movable connection between the upper body 120 and the lens housing 110 to push the lens housing 110 around in space. Due to the connection through the shafts 205, 215 and hinge 210, as the lens housing 110 is moved in space, the lens housing 110 will maintain the proper orientation by performing panning movements about the rotating lower shaft 215 and tilting movements about the hinge 210 via the upper shaft 205. Thus, as shown in FIGS. 2A and 2B, the horizontal plane of a camera component, such as a camera component that includes a CMOS image sensor, included in the lens housing 110 may be maintained despite various pan and tilt movements of the camera.

Figure 3A:
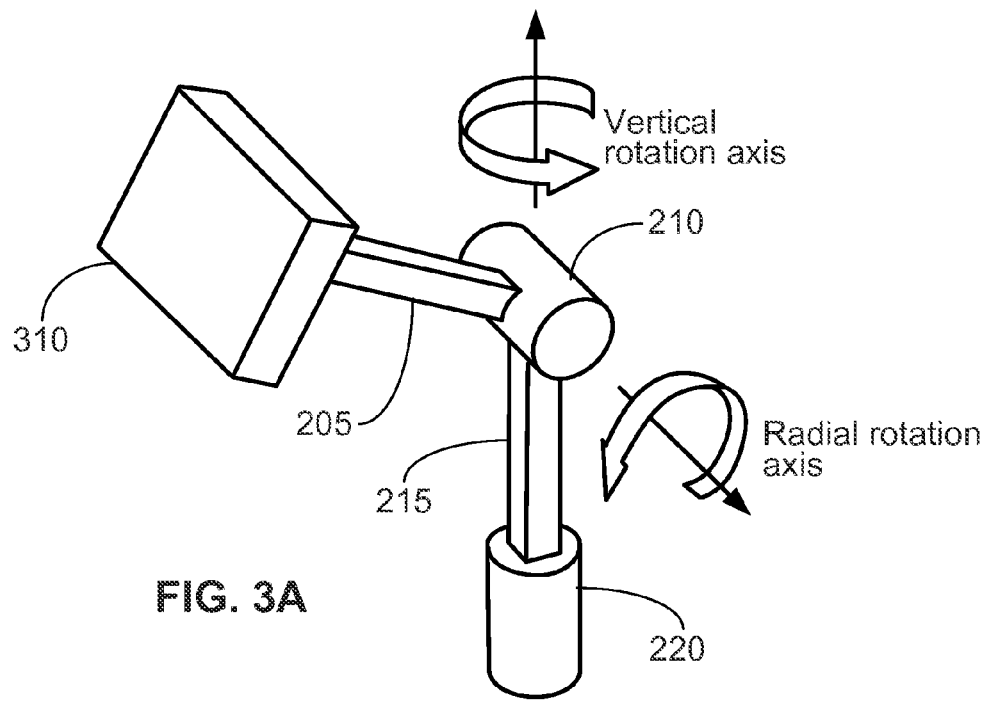
FIG. 3A depicts a mechanism for a pan and tilt camera.
Figure 3B:
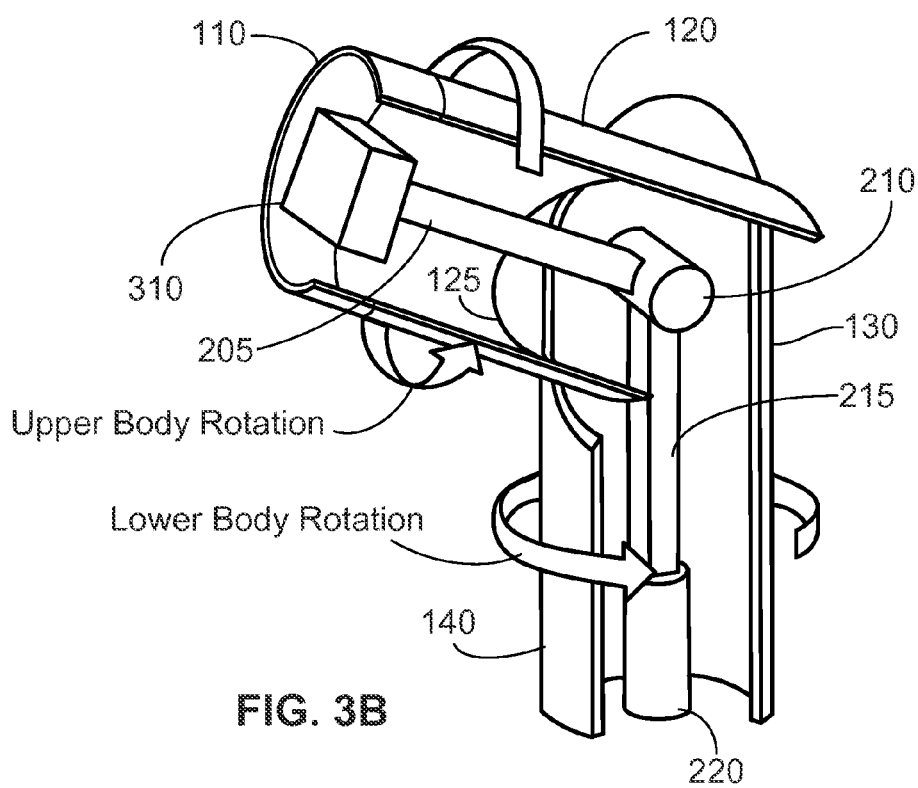
FIG. 3B is a cutaway view of a pan and tilt camera.

FIGS. 3A and 3B further illustrate a mechanism for enabling the lens housing 110 of the pan and tilt camera to maintain the proper image orientation throughout the range of movements of the pan and tilt camera. As shown, FIG. 3A presents a shaft and hinge structure similar to those of FIGS. 2A and 2B, which is capable of maintaining the orientation of a camera component located in the lens housing 110 throughout the range of movements of the pan and tilt camera. FIG. 3B illustrates the shaft and hinge structure as it is configured within the pan and tilt camera body structure.

More specifically, FIG. 3A includes a manipulated object 310 corresponding to the camera component included in the lens housing 110 of the pan and tilt camera or the lens housing 110 of the pan and tilt camera itself. An upper shaft 205, shown as a radial link in FIG. 3A, is rigidly connected to the manipulated object 310 and extends from the manipulated object 310 to an elbow hinge 210. The upper shaft 205 functions to aim the manipulated object 310 in a desired direction that results from the combined angular orientations of the hinges 210, 220 shown in FIG. 3A. Specifically, this upper shaft 205 functions to aim the manipulated object 310 according to the pan and tilt of the camera. The elbow hinge 210 connects the upper shaft 205 to a lower shaft 215, shown as a vertical link in FIG. 3A. The elbow hinge 210 enables the upper shaft 205 to swing about the axis of the elbow hinge 210 such that the manipulated object 310 can move in an arc generally along the vertical direction. Therefore, the movement enabled by the elbow hinge 210 corresponds to the tilt movement of the pan and tilt camera. In some implementations, the elbow hinge 210 is located proximate to the transection of the tubular structure that forms the upper and lower bodies 120, 130. For example, the elbow hinge 210 may be located at a position within the cylindrical body structure of the pan and tilt camera that corresponds to the location where the cylindrical body structure is transected to form the upper and lower bodies 120, 130, as shown in FIG. 3B. Connected to the elbow hinge 210 is the lower shaft 215 that extends from the elbow hinge 210 towards the base 140 of the pan and tilt camera. According to the implementation of the pan and tilt camera illustrated in FIG. 3A, the lower shaft 215 may be connected to a base hinge 220 that enables the lower shaft 215 to rotate about the axis perpendicular to the bottom edge of the lower body 130 that passes through the center of the lower body 130. Furthermore, the base hinge 220 may be configured to enable the lower shaft 215 to rotate about the axis perpendicular to the bottom edge of the lower body 130 that passes through the center of the lower body 130, but not to rotate about the axis of the elbow hinge 210, such that the lower shaft 215 is only capable of rotating about the axis perpendicular to the bottom edge of the lower body 130. In addition to enabling such rotation of the lower shaft 215, the base hinge 220 may connect the assembly shown in FIG. 3A to the base 140 of the pan and tilt camera. For example, the base hinge 220 may be a slip ring that connects the lower shaft 215 to the base 140 and is configured to transmit the electrical power or other signals transmitted by the power cord 150. In such an instance, wires or other conductors connected to or within the upper and lower shafts 205, 215 and the hinge 210 may be connected to the camera component or other components of the pan and tilt camera, to provide power or transmit information to and from those components. Using such a method enables the pan and tilt camera to continuously pan in any direction, since any wires within the camera would not become twisted by this motion. Such continuous panning cannot readily be achieved by other pan and tilt camera that rely upon wired connections that would become twisted by continuous panning.

FIG. 3B shows the described shaft and hinge structure of FIG. 3A and the body structure of the pan and tilt camera when they are integrated to form a complete pan and tilt camera. As illustrated in FIG. 3B, the shaft and hinge structure of FIG. 3A connects a manipulated object 310, such as a camera component located within the lens housing 110, to the base 140 of the pan and tilt camera, such that the upper and lower shafts 205, 215 of FIG. 3A extend through the upper and lower bodies 120, 130, respectively. In FIG. 3B, the pan and tilt camera is illustrated in a position in which the upper body 120 has been rotated with respect to the lower body 130 about the axis perpendicular to the transection of the tubular structure forming the upper and lower bodies 120, 130, resulting in a tilt of the pan and tilt camera to an angle between the horizon and a direction parallel to the axis perpendicular to the bottom edge of the lower body 130 (i.e., vertical when the pan and tilt camera is positioned as shown in FIG. 3B).

The base 140 of the pan and tilt camera of FIG. 3B is fixed to a surface, and an actuator such as an electric or magnetic motor rotates the lower body 130 of the pan and tilt camera. As the lower body 130 of the pan and tilt camera rotates, this rotation is also translated to the upper body 120 and to the lens housing 110 connected to the upper body 120. The coupling of the lens housing 110 and the manipulated object 310 causes the manipulated object 310 to also be rotated in a panning direction about the axis perpendicular to the bottom edge of the lower body 130. Rotation of the manipulated object 310 is permitted by the rotation of the lower shaft 215 that is coupled to the base hinge 220.

Similarly, as the upper body 120 rotates with respect to the lower body 130 about the axis perpendicular to the transection, the lens housing 110 undergoes an arc-like movement that represents the tilting motion of the pan and tilt camera. An actuator, such as an electric or magnetic motor, causes the upper body 120 to rotate with respect to the lower body 130 about the axis perpendicular to the transection, resulting in the tilting of the pan and tilt camera. As the upper body 120 rotates, it causes the upper shaft 205 connected to the manipulated object 310 to rotate about the axis of the elbow hinge 210, and also causes the lower shaft 215 connected to the manipulated object 310 through the elbow hinge 210 and the upper shaft 205 to rotate about the axis perpendicular to the bottom edge of the lower body 130 permitted by the base hinge 220. Cumulatively, the rotation about the axis perpendicular to the bottom edge of the lower body 130 and the rotation about the axis of the elbow hinge 210 represent the pan and tilt movements of the pan and tilt camera, respectively, such that the orientation of the manipulated object 310 with respect to the horizon is maintained regardless of the movements of the upper and lower bodies 120, 130 of the pan and tilt camera. As a result, a camera component corresponding to the manipulated object 310 of FIGS. 3A and 3B that is located in the lens housing 110 can maintain a proper image orientation regardless of pan and tilt movements, for example, an image orientation having a long dimension that is parallel to the horizontal.

Figure 4A:
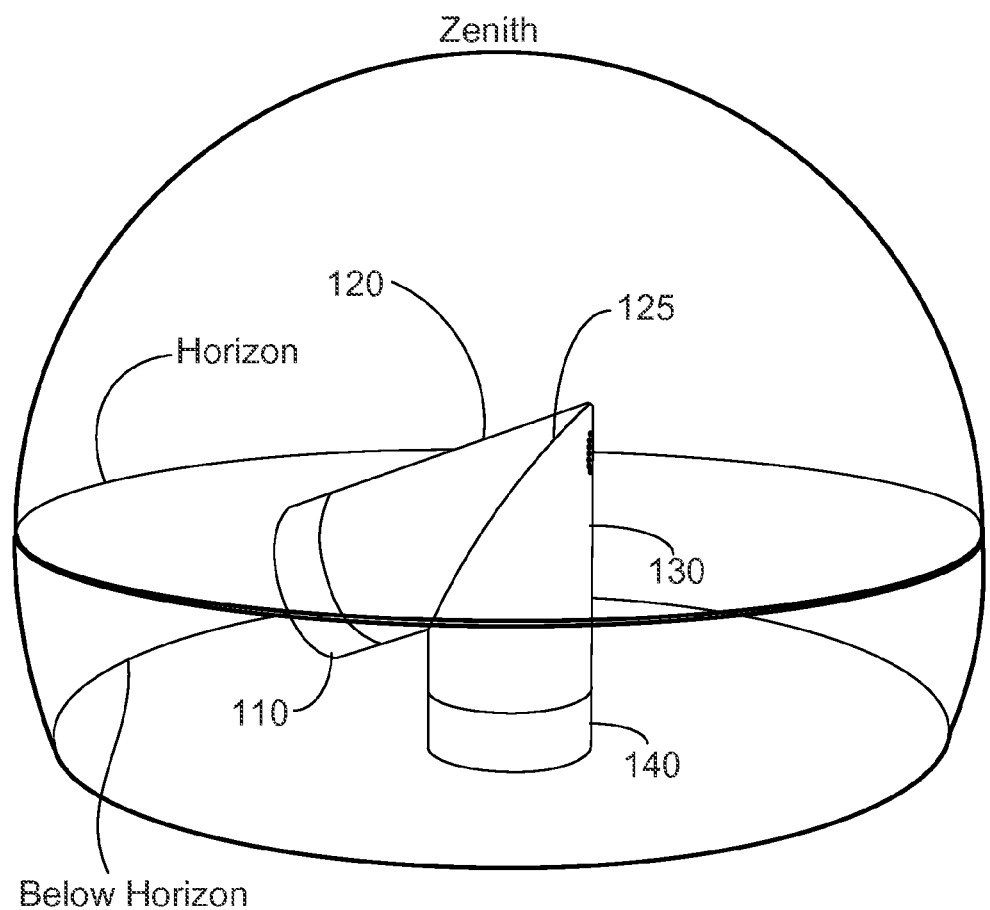
FIG. 4A depicts a range of possible fields of view for a pan and tilt camera.
Figure 4B:
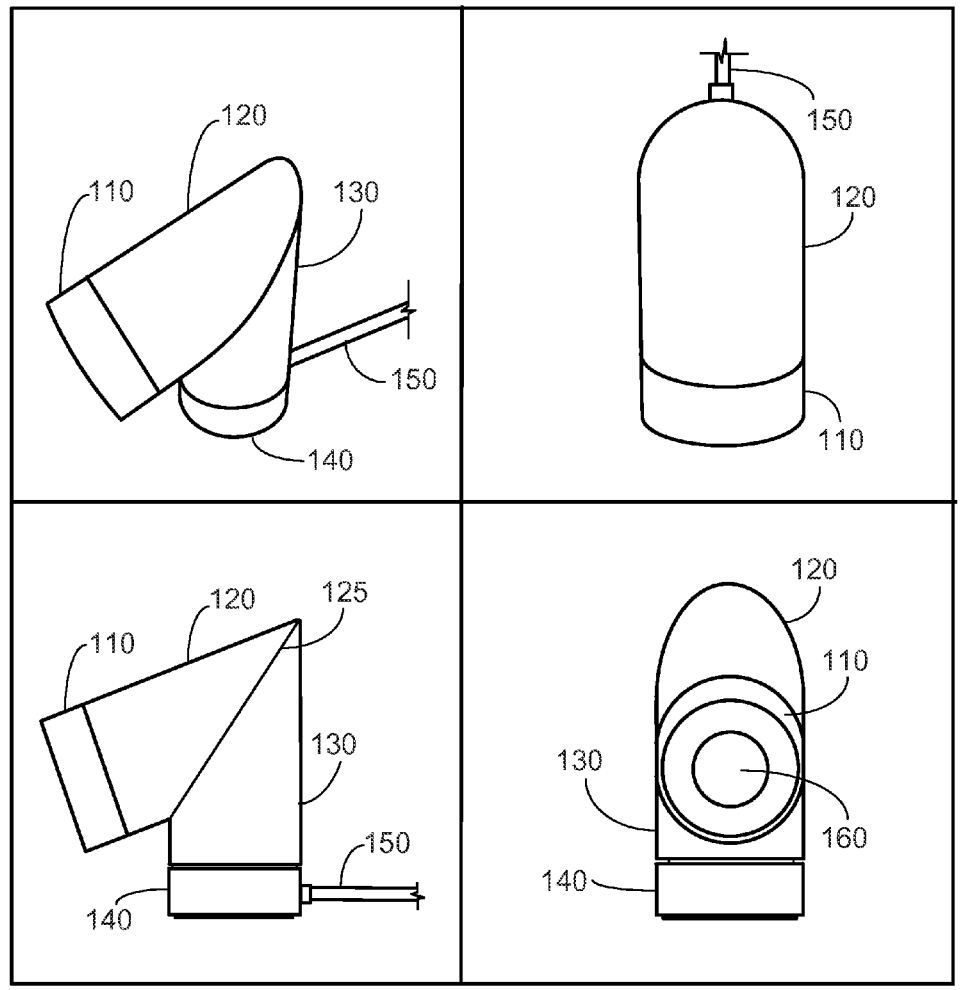
FIGS. 4B and 4C depict a pan and tilt camera configured to have particular fields of view.
Figure 4C:
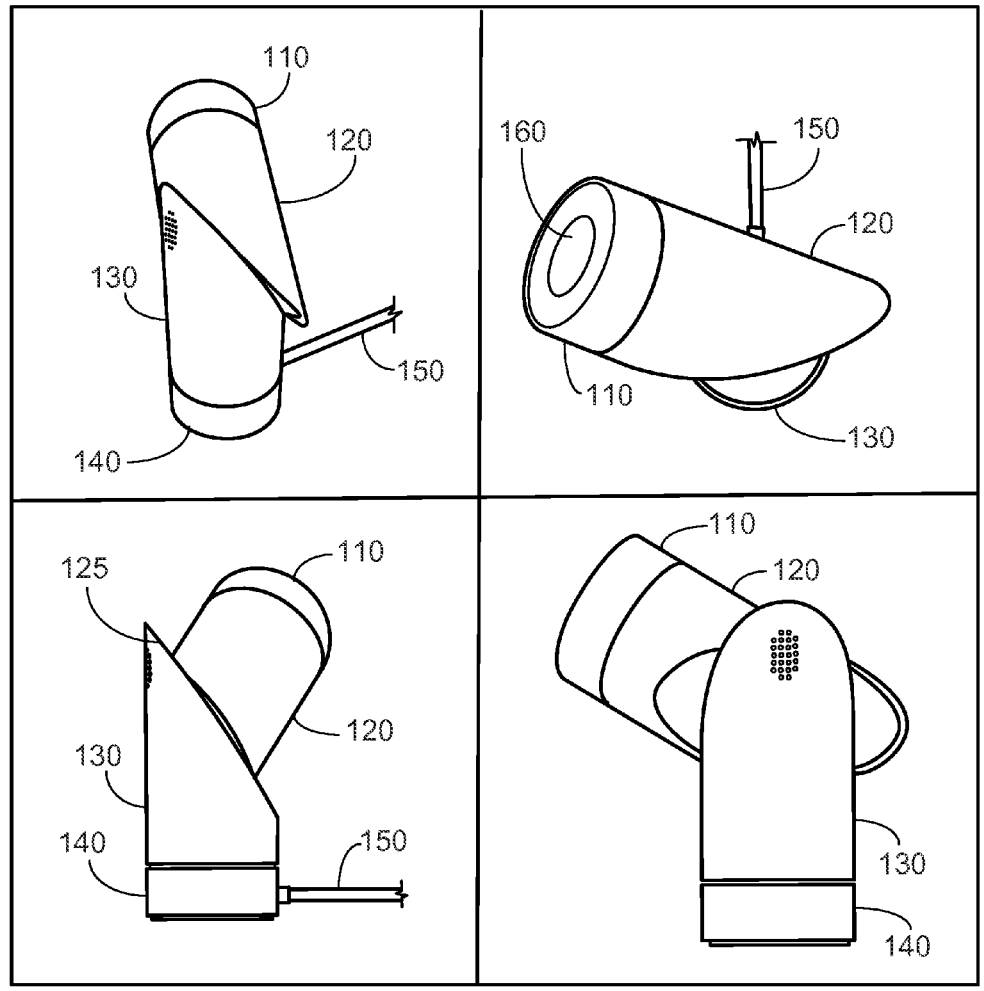

FIGS. 4A through 4C illustrate possible fields of view of the pan and tilt camera, as well as possible configurations of the pan and tilt camera that enable the pan and tilt camera to achieve those fields of view. While these illustrations generally describe the capabilities of the pan and tilt camera to monitor various fields of view, the specific fields of view available to a particular pan and tilt camera according to this description may be dependent upon certain design characteristics of the pan and tilt camera. For instance, by changing the angle 125 at which the tubular structure is transected to form the upper and lower bodies 120, 130 of the pant and tilt camera, the range of the tilt movement of the camera's lens housing 110 may be adjusted.

As an example, FIG. 4A provides an illustration that describes the possible fields of view of the pan and tilt camera according to certain embodiments. As shown in FIG. 4A, the range of possible fields of view of the camera may be described by a modified hemisphere, such that the possible fields of view of the pan and tilt camera range from the zenith of the modified hemisphere (e.g., along the axis perpendicular to the bottom edge of the lower body 130 passing through the middle of the lower body 130) to a point below the horizon of the modified hemisphere (e.g., a point below the axis that is parallel to the bottom edge of the lower body 130). The pan and tilt camera is capable of attaining any field of view along this range from the zenith to the point near or below the horizon and in any direction around the axis perpendicular to the bottom edge of the lower body 130. That is, the pan and tilt camera may be capable of performing 360 degree imaging at any tilt that is described by the modified hemisphere.

The range of possible tilt positions of the camera can be specified based on the angle 125 by which the tubular structure forming the upper and lower bodies 120, 130 is transected. Generally, a steeper angle (e.g., an angle of fifty five degrees from the horizon shown in FIG. 4A) between the transection and the bottom edge of the lower body 130 allows the pan and tilt camera to have a field of view that is further below the horizontal than a shallower angle (e.g., an angle of 45 degrees from the horizon shown in FIG. 4A). For example, as shown in FIG. 4A, the tubular structure forming the upper and lower bodies 120, 130 is transected at a fifty five degree angle relative to the horizon shown in FIG. 4A, and is capable of performing tilt movements that range from the zenith of the modified hemisphere to a point that is approximately twenty degrees below the horizon. In contrast, if the tubular structure forming the upper and lower bodies 120, 130 were transected at a forty five degree angle, the range of possible tilt movements would range from the zenith of the modified hemisphere to a point at the horizon (i.e., zero degrees below the horizon) of the modified hemisphere.

FIGS. 4B and 4C illustrate the pan and tilt camera when it is configured to have various fields of view. Specifically, FIG. 4B provides four views of the pan and tilt camera including an isometric view, an elevation view, a profile view, and a plan view, at a time when the pan and tilt camera is configured to have a field of view that is at its lowest point. For example, FIG. 4B displays the pan and tilt camera of FIG. 4A with an angle 125 of transection of 55 degrees at a time when the pan and tilt camera is configured to have a field of view that is twenty degrees below the horizon of the modified hemisphere. FIG. 4C provides four views of the pan and tilt camera including an isometric view, a plan view, a profile view, and an elevation view, at a time when the pan and tilt camera is configured to have a field of view lying at a point between the zenith and the lowest possible field of view for the pan and tilt camera. For example, FIG. 4C shows the pan and tilt camera of FIG. 4A when the camera is configured to have a field of view that lies at a point between the zenith of the modified hemisphere and the point twenty degrees below the horizon.

The pan and tilt camera according to the described embodiments may be configured for mounting to any number of surfaces, such as a wall, ceiling, roof, window sill, or other surface. Generally, the pan and tilt camera may be mounted such that the base 140 is fixed to the surface, with the camera generally being capable of mounting in any orientation. Preferred mounting orientations of the pan and tilt camera may be such that the base 140 of the camera is mounted to a surface parallel to the horizon, for example, a ceiling or floor. The camera may also be mounted to other surfaces that are vertical, such as a wall, or at an angle, such as on a slanted roof. In some instances, mounting of the pan and tilt camera may utilize a mounting bracket. Mounting of the pan and tilt camera may utilize a method similar to a drywall anchor, a wood screw, a concrete anchor, or other types of anchors. In some implementations, mounting of the pan and tilt camera can utilize a unique type of mounting screw to enable the installation and subsequent removal of the camera.

Figure 5:
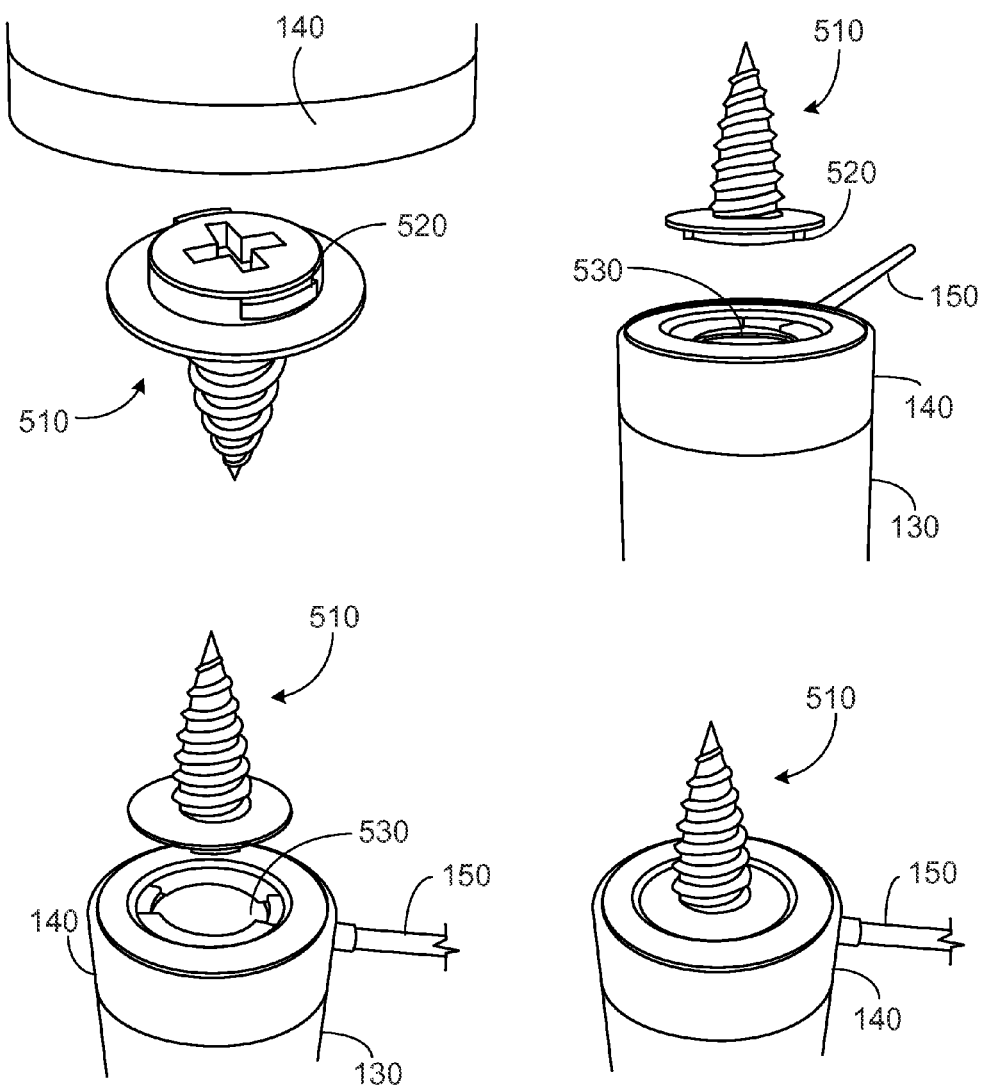
FIGS. 5 and 6 depict mechanisms for attaching a pan and tilt camera to another structure.

Specifically, FIG. 5 illustrates mounting hardware that can be used to affix the pan and tilt camera to a surface. As shown in FIG. 5, the hardware is generally a screw 510, similar to a screw-in drywall anchor, which has been adapted to allow attachment of the pan and tilt camera directly to the screw 510. As shown in the left most illustration of FIG. 5, the mounting screw 510 can have a structure that is similar to a screw-in drywall anchor, with the head 520 of the screw having an extended height. The extended-height screw head 520 may have a feature, such as threads or a bayonet mount on the outside circumference of the screw head 520, a locking mechanism on the screw head 520, or another mechanism, that allows the base 140 of the pan and tilt camera to attach to the screw head 520. For example, the extended screw head 520 of the mounting screw 510 can have external threads and the base 140 of the pan and tilt camera can have corresponding threads 530 that match those of the mounting screw 510. The mounting screw 510 can then be attached to a surface, such as a ceiling, and the pan and tilt camera can subsequently be attached to the screw head 520 of the mounting screw 510 via the threads 530. By threading the base 140 of the pan and tilt camera onto the threaded mounting screw head 520, the pan and tilt camera can be attached to the mounting screw 510, thereby mounting the pan and tilt camera to the surface where the mounting screw 510 is installed. Additionally, the pan and tilt camera may be subsequently removed from the surface to which it is attached by unscrewing the pan and tilt camera from the screw 510.

Figure 6:
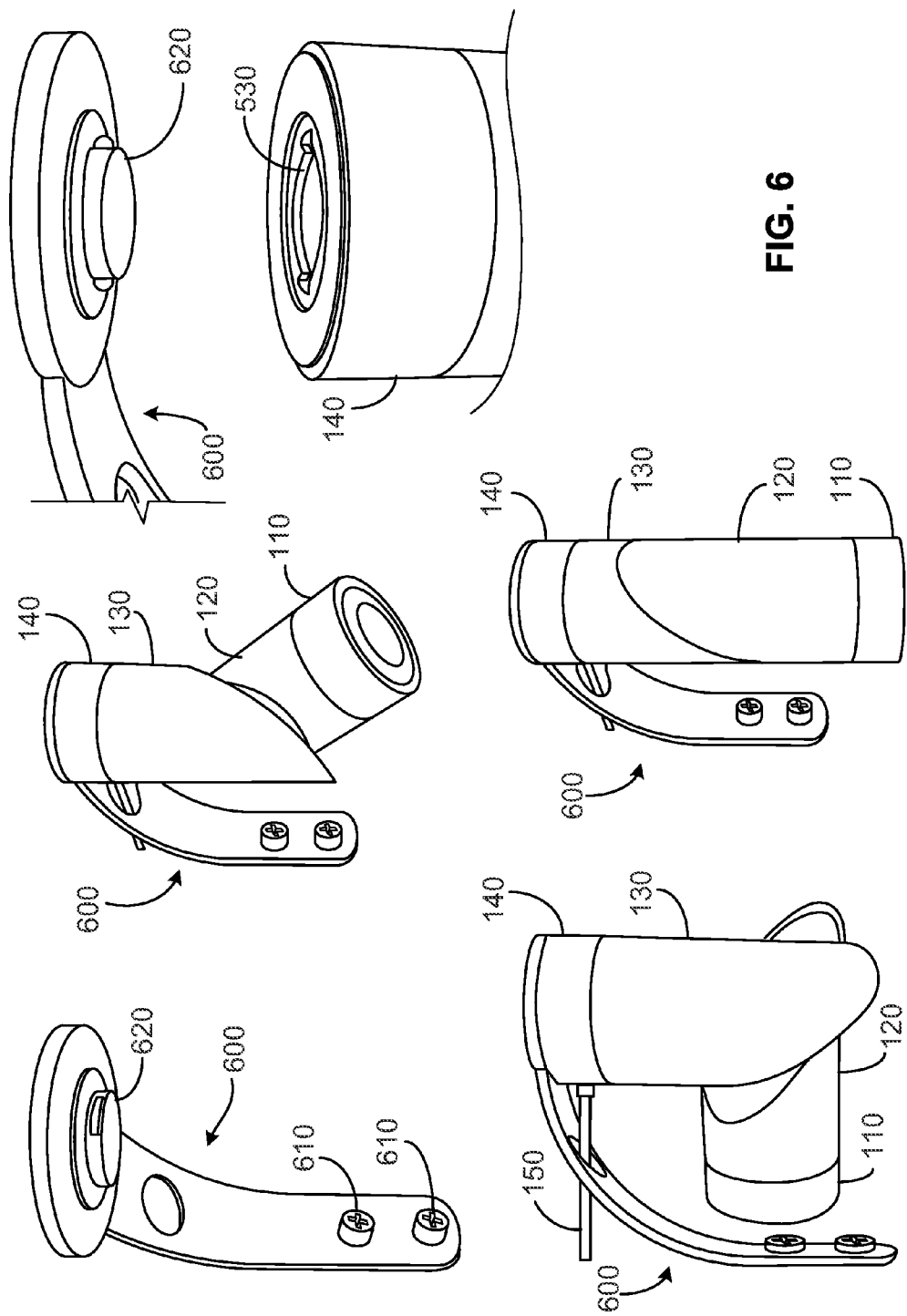

In some implementations, a similar technique can be used to mount the pan and tilt camera to a wall or other vertical or slanted surface via a mounting bracket. FIG. 6 illustrates such a mounting bracket 600, in which the mounting bracket 600 is attached to the surface via screws 610 or another mounting method, such as an adhesive. The mounting bracket 600 includes threads 620 or another locking mechanism, such as a bayonet connection, that enables the base 140 of the pan and tilt camera that features corresponding threads 630 or other features configured to interface with the mounting bracket 600, to connect to the mounting bracket 600. Using the mounting bracket 600 as shown in FIG. 6, the pan and tilt camera can be mounted to a wall or other vertical surface such that its possible fields of view range from directly under the pan and tilt camera to a direction at or above the horizon. Such a configuration may be particularly useful in certain applications, for example, when the camera is mounted at a high position on a wall for surveillance and monitoring applications.

In still other instances, it may be preferable to configure the pan and tilt camera to sit on a surface, such as a floor or table, in order to perform monitoring or surveillance. To enable such applications, the base 140 of the pan and tilt camera may feature a foot, such as a rubber or other non-slip foot, to ensure that the pan and tilt camera will not tip or slide when the camera is configured to have certain fields of view. For example, when the pan and tilt camera is configured to have a field of view that is below the zenith of the modified hemisphere of FIG. 4A that corresponds to the camera's possible fields of view, the pan and tilt camera may be unbalanced, causing the camera to tip. To prevent this, a foot maybe affixed to the base 140 of the camera to ensure that the camera does not tip while in such a configuration. Additionally, the foot affixed to the base 140 of the pan and tilt camera may have a rubber or other non-slip surface to help prevent the pan and tilt camera from sliding, spinning, or tipping when the lower and/or upper body sections of the camera are in motion. For example, the forces exerted by the motors controlling the upper and lower bodies 120, 130 of the body may cause the base 140 of the pan and tilt camera to rotate (e.g., when the lower body 130 is rotating via a torsional force) or to tip (e.g., when the upper body 120 is moving in an arc). The presence of a non-slip footing on the base 140 of the pan and tilt camera, however, may help prevent such movements from occurring, thereby stabilizing the camera. Furthermore, the base 140 may be configured to have a greater weight than other portions of the camera, or may feature additional anchoring weights, to discourage the camera from rotating or tipping. Such weight included in the base 140 lowers the center of gravity of the pan and tilt camera, thereby making it less likely to tip, and increases the frictional force between the bottom of the base 140 and the surface that the camera is resting on, thereby discouraging the camera base 140 from rotating while the pan and tilt camera is panning or tilting.

To further discourage the panning and tilting movements of the camera from causing movement or unbalancing of the pan and tilt camera, the pan and tilt camera may be configured move with an appropriate acceleration, so as to discourage the camera from rotating or tipping. For example, control software associated with the pan and tilt camera may dictate that movements of the pan and tilt camera caused by the motors occur with a particular acceleration to avoid the camera tipping or the base of the camera rotating. In some implementations, the control software may dictate a static acceleration, may have a variable acceleration, may have an acceleration set by a user preference, or may use feedback from sensors included with the pan and tilt camera (e.g., accelerometers and/or gyroscopes) to determine whether the camera base 140 is rotating or tilting, and to adjust the acceleration of the motion of the camera based on the feedback data.

The pan and tilt camera may be further configured to protect itself from contact by a user or contact with an object or structure, such as a wall, while the camera is in motion. Since the upper and lower body sections of the pan and tilt camera are moved by a pair of motors, such as electric motors, the motors may be damaged if they are subjected to resistance while trying to rotate the upper or lower bodies 120, 130 in a particular direction. To combat this, the pan and tilt camera may be configured to detect interference, such as interference caused by a user touching the camera while it is moving or interference caused by the camera contacting a nearby object, such as a wall. In response to detecting the interference, the camera can stop the motors that are driving the upper and/or lower body sections, for example, by reducing power supplied to the motors. In doing so, damage to the motors may be prevented.

In some implementations, capabilities to detect interference of the camera motion may be encoded in control logic associated with the pan and tilt camera. Additionally, in some instances, the pan and tilt camera may be capable of learning or storing a history of instances in which the camera detected interference while in motion. The camera can store and recall the locations where such interference occurred, and can operate to avoid those locations in future motions of the camera. For example, if the pan and tilt camera detects interference when moving due to the presence of a wall that is near the camera, the camera can store information indicating that there is an object interfering with the motion of the camera at the location of the wall. Subsequently, if the camera is directed to move to a particular field of view, the camera may utilize a series of motions to obtain the particular field of view that avoids the location of the previously detected wall.

Figure 7:
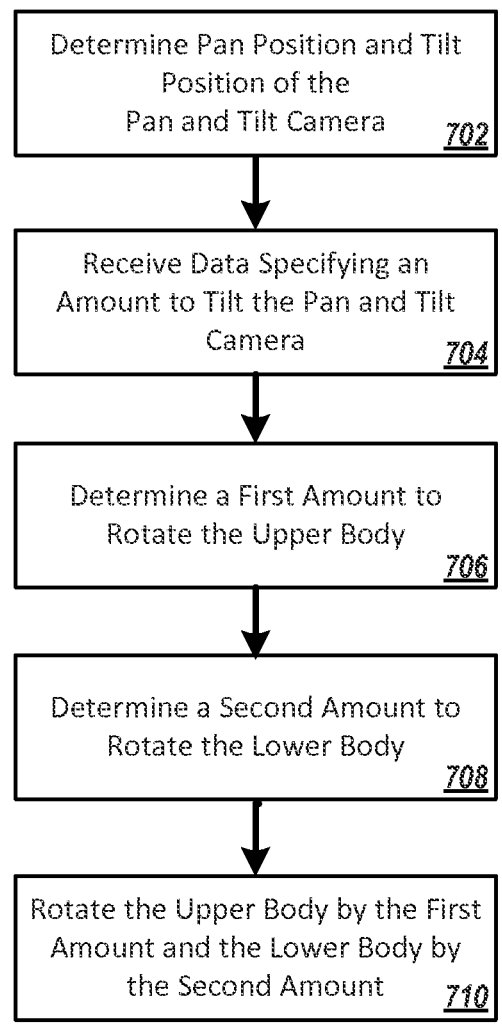
FIG. 7 depicts a flowchart for an example process.

FIG. 7 illustrates an example of a process 700 for controlling the pan and tilt camera. Specifically the process 700 enables a user of the pan and tilt camera to specify an amount by which the field of view of the camera should tilt, to determine an amount by which to rotate the upper body 120 and the lower body 130 to obtain the specified tilt without affecting the pan position of the camera, and controlling the pan and tilt camera to rotate the upper and lower bodies 120, 130 by the determined amounts to achieve the specified tilt. In some implementations, the process 700 may be implemented by a computing device contained within or exterior to the pan and tilt camera, such as a microprocessor included within the body of the pan and tilt camera, or a computing The process 700 includes determining an initial pan position and an initial tilt position of the pan and tilt camera (702). Determining the initial pan position of the pan and tilt camera comprises determining an angular position of the lens housing 110 of the pan and tilt camera. For example, the angular position of the lens housing 110 can be determined based on the angle between a reference direction in the plane of the bottom edge of the lower body 130 and a direction determined by the projection of an axis perpendicular to the top of the lens house 110 is pointing onto the plane of the bottom edge of the lower body 130. This angular position represents the initial pan position of the pan and tilt camera, e.g., the direction along the horizon in which the pan and tilt camera is pointed when the pan and tilt camera is mounted in the positions shown in FIG. 4A or FIG. 6. Determining the initial tilt position of the pan and tilt camera comprises determining an angle between an axis perpendicular to the top of the upper body 120 and an axis perpendicular to the bottom edge of the lower body 130. While the pan position and tilt position may be defined as set forth here, the pan and tilt positions of the pan and tilt camera may be defined by other means as well. For instance, the pan position may be defined by a compass heading in which the axis perpendicular to the top of the lens housing 110 is pointed, the tilt position may be defined by the angle between the axis perpendicular to the top of the lens housing 110 and an axis parallel to the bottom edge of the lower body 130, etc.

Data is received that specifies an amount by which to tilt the pan and tilt camera (704). For example, a user of the pan and tilt camera can provide an input to a computer system controlling the pan and tilt camera that specifies an angle by which to adjust the tilt of the pan and tilt camera. Alternatively, data can be received that specifies a tilt position, such as a desired tilt position specified by the user of the pan and tilt camera. Other information or data may be received that otherwise effectively specify an amount by which to tilt the pan and tilt camera, such as information specifying a desired field of view of the pan and tilt camera, or other information. In some instances, information can also be received that specifies an amount to pan the pan and tilt camera. For example, in addition or alternatively to the information specifying the amount to tilt the pan and tilt camera, information can be received that indicates an angle by which the pan of the pan and tilt camera should be changed, a target angular position of the pan and tilt camera, a target field of view of the pan and tilt camera, etc., such that the received information can be used to determine how to adjust the pan of the pan and tilt camera.

In some implementations, a system may confirm whether the received information specifying the amount to tilt the pan falls within a possible range for the pan and tilt camera. For example, if the pan and tilt camera is in a tilt position such that a requested change to the tilt is not possible due to the limitations of the design of the pan and tilt camera, a determination may be made that the requested change to the tilt of the pan and tilt camera is not possible. An example may occur if the pan and tilt camera is tilted to view a point slightly below the horizon as shown in FIG. 4A, and information is received that specifies the tilt of the camera should be adjusted 60 degrees further below the horizon. A determination may be made that the requested change to the tilt of the pan and tilt camera is not possible due to the request specifying a tilt of the camera that is outside of the possible range for the camera. In response, information may be provided to a user of the pan and tilt camera, e.g., by an indicator light on the camera, by a notification provided to a computing device used to control the camera, etc., that indicates that the requested change to the tilt of the camera is not possible, or requesting that the user specify a different amount by which to adjust the tilt of the pan and tilt camera.

In some instances, the information provided may specify additional information, such as a maximum possible change to the tilt of the pan and tilt camera, or other relevant information.

An amount to rotate the upper body is determined based at least on the determined tilt position of the pan and tilt camera, the angle of the transection, and the specified amount to tilt the pan and tilt camera (706). For example, the tubular structure is transected at an angle 125 to define the upper and lower bodies 120, 130. Based on the angle 125 of the transection, the determined tilt position, and the specified angular amount by which to tilt the pan and tilt camera, a determination can be made as to how much the upper body 120 should be rotated about the axis perpendicular to the transection to achieve the desired tilt angle. Since rotation of the upper body 120 about the axis perpendicular to the transection results in an arc-like movement of the upper body 120, the amount that the upper body 120 must be rotated to achieve a target amount of change in angular tilt of the upper body 120 is dependent upon the current tilt position of the pan and tilt camera. In some instances, determining the amount by which to rotate the upper body 120 may involve a processor or other computing device determining the amount by which to rotate the upper body 120. In other implementations, the amount by which the upper body 120 must be rotated may be determined by other means, such as accessing a lookup table that specifies an amount to rotate the upper body 120 based on a current tilt position of the pan and tilt camera, the angle 125 of the transection, and the specified amount by which to change the tilt of the pan and tilt camera. Other means for determining this amount may also be implemented, such as by use of a proportional-integral-derivative (PID) controller.

An amount to rotate the lower body of the pan and tilt camera is also determined based at least on the determined amount to rotate the upper body of the pan and tilt camera (708). Adjusting the tilt of the pan and tilt camera by rotating the upper body 120 about the axis perpendicular to the transection also affects the pan position of the pan and tilt camera. Therefore, in order to maintain the initial pan position determined for the pan and tilt camera, the lower body 130 of the pan and tilt camera must also be rotated. The amount by which to rotate the lower body 130 is therefore based on the amount that the upper body 120 must be rotated to achieve the specified amount to tilt the pan and tilt camera. Determining the amount by which to rotate the lower body 130 may involve computing the amount to rotate the lower body 130 based at least on the amount by which the upper body 120 must be rotated. Alternatively, the amount to rotate the lower body 130 may be determined by accessing a lookup table or other data that specifies an amount needed to maintain a pan position of the pan and tilt camera based on the determined amount of rotation of the upper body 120. Other means may be used for determining the amount by which to rotate the lower body 130 to maintain the initial pan position, for example, the use of a PID controller or other mechanism to determine the amount by which to rotate the lower body 130.

The upper and lower bodies of the pan and tilt camera are rotated by the determined amounts (710). For example, based on determining the amount to rotate the upper body 120 and the amount to rotate the lower body 130, electrical or magnetic motors associated with the upper and lower bodies 120, 130 can be controlled to cause the upper and lower bodies 120, 130 to rotate by the determined amounts. By rotating the upper and lower bodies 120, 130 by the determined amounts, the pan and tilt camera can be tilted by the specified amount without affecting the pan position of the pan and tilt camera.

Additionally, if a change to the pan of the pan and tilt camera is also specified, an amount to rotate the lower body to achieve the requested pan may be determined. For example, based on receiving information specifying a target pan position of the camera or an amount to change the pan position of the camera, a determination can be made as to how much the lower body 130 of the pan and tilt camera must be rotated to achieve this change in the pan position of the camera. The amount to rotate the lower body 130 may be determined based at least on the specified amount to change the pan position of the camera and the determined amount to rotate the lower body 130 of the pan and tilt camera to achieve the specified change in the tilt of the pan and tilt camera.

The described device and techniques may be implemented in any material and using any process capable of forming the described structures and of performing the described actions. The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A pan and tilt camera comprising:
   a cylindrical base;
   a tubular body having a top edge, a bottom edge, and a tubular side, the tubular side of the cylindrical body being transected at an angle to define a lower body and an upper body, the lower body having a bottom edge that corresponds to the bottom edge of the tubular body and a top edge corresponding to the angle of transection, and the upper body having a bottom edge that corresponds to the angle of transection and a top edge that corresponds to the top edge of the tubular body, wherein the bottom edge of the lower body is movably attached to a top of the cylindrical base such that the lower body is configured to rotate with respect to the cylindrical base about an axis that is perpendicular to the bottom edge of the lower body and that passes through a center of the lower body, and wherein the upper body is configured to rotate about an axis perpendicular to the angle of transection; and
   a cylindrical housing having a bottom edge that is movably attached to the top edge of the upper body such that the cylindrical housing is configured to rotate about an axis that is perpendicular to the bottom edge of the cylindrical housing and that passes through a center of the cylindrical housing, and wherein the cylindrical housing is coupled to a camera component.

2. The pan and tilt camera of claim 1, comprising:
   a first shaft having a first end and a second end, the first end of the first shaft being coupled to the camera component and the second end of the first shaft being coupled to a hinge that permits rotation of the first shaft about an axis that is parallel to the top of the cylindrical base, the rotation of the first shaft about the axis that is parallel to the top of the cylindrical base corresponding to a tilt motion of the pan and tilt camera, wherein the first shaft extends through the upper body along an axis that is perpendicular to the top edge of the upper body; and
   a second shaft having a first end and a second end, the first end of the second shaft being coupled to the hinge and the second end of the second shaft being movably connected to the top of the cylindrical base such that the second shaft is configured to rotate about the axis that is perpendicular to the bottom edge of the lower body, the rotation of the second shaft about the axis that is perpendicular to the bottom edge of the lower body corresponding to a pan motion of the pan and tilt camera, wherein the second shaft extends through the lower body along the axis that is perpendicular to the bottom edge of the lower body.

3. The pan and tilt camera of claim 2, wherein the rotation of the first shaft about the axis that is parallel to the top of the cylindrical base corresponding to the tilt motion of the pan and tilt camera does not change an orientation of the camera component with respect to the axis that is parallel to the top of the cylindrical base, and the rotation of the second shaft about the axis that is perpendicular to the bottom edge of the lower body corresponding to the pan motion of the pan and tilt camera does not change an orientation of the camera component with respect to the axis that is parallel to the top of the cylindrical base.

4. The pan and tilt camera of claim 2, wherein the second shaft is connected to the top of the cylindrical base by an electrical rotary joint such that the second shaft is configured to rotate about the axis that is perpendicular to the bottom edge of the lower body.

5. The pan and tilt camera of claim 1, comprising:
   a first motor configured to rotate the upper body about the axis perpendicular to the angle of transection; and a second motor configured to rotate the lower body about the axis that is perpendicular to the bottom edge of the lower body and that passes through the center of the lower body.

6. The pan and tilt camera of claim 1, wherein the cylindrical base is coupled to a cord that is configured to carry electrical power or electrical signals for the pan and tilt camera.

7. The pan and tilt camera of claim 1, wherein the camera component comprises a charge coupled device (CCD) image sensor, a complementary metal-oxide semiconductor (CMOS) image sensor, or a back-side illuminated CMOS (BSI-CMOS) image sensor.

8. The pan and tilt camera of claim 1, wherein the cylindrical housing includes a heat sink that is coupled to the camera component.

9. The pan and tilt camera of claim 1, wherein the angle of the transection is between 45 and 55 degrees relative to the bottom edge of the lower body.

10. The pan and tilt camera of claim 1, wherein a bottom of the cylindrical base comprises one or more threads or a bayonet mount.

11. The pan and tilt camera of claim 1, wherein the transection passes through a middle of the tubular body.

12. The pan and tilt camera of claim 1, wherein the cylindrical housing has a top, and wherein the top of the cylindrical housing includes an aperture.

13. A computer-implemented method for controlling a pan and tilt camera comprising:
  determining (i) a pan position of the pan and tilt camera, and (ii) a tilt position of the pan and tilt camera, wherein:
    determining the pan position of the pan and tilt camera comprises determining an angular position of a cylindrical housing that includes a camera component, the cylindrical housing of the pan and tilt camera having a bottom edge that is movably attached to a top edge of an upper body, wherein the upper body is defined from a tubular body having a top edge, a bottom edge, and a tubular side, the tubular side of the cylindrical body being transected at an angle to form a lower body and the upper body, the lower body having a bottom edge that corresponds to the bottom edge of the tubular body and a top edge that corresponds to the angle of transection, and the upper body having a bottom edge that corresponds to the angle of transection and the top edge that corresponds to the top edge of the tubular body, wherein the lower body can rotate about an axis that is perpendicular to the bottom edge of the lower body and that passes through a center of the lower body, and wherein the upper body can rotate about an axis that is perpendicular to the angle of transection, and wherein the angular position of the cylindrical housing is determined with respect to the axis perpendicular to the bottom edge of the lower body and that passes through the center of the lower body, and
    determining the tilt position of the pan and tilt camera comprises determining an angle between an axis that is perpendicular to the bottom edge of the cylindrical body and an axis that is perpendicular to the top edge of the upper body;
  receiving data specifying an amount to tilt the pan and tilt camera;
  determining, based at least on the tilt position of the pan and tilt camera, the angle of transection, and the amount to tilt the pan and tilt camera, a first amount to rotate the upper body about the axis that is perpendicular to the angle of transection;
  determining, based at least on the first amount, a second amount to rotate the lower body about the axis that is perpendicular to the bottom edge of the lower body and that passes through the center of the lower body to maintain the angular position of the cylindrical housing; and
  rotating the upper body about the axis that is perpendicular to the angle of transection by the first amount and rotating the lower body about the axis that is perpendicular to the bottom edge of the lower body and that passes through the center of the lower body by the second amount to tilt the pan and tilt camera by the specified amount without affecting the pan position of the pan and tilt camera.

14. The computer-implemented method of claim 13, wherein rotating the upper body about the axis that is perpendicular to the angle of transection by the first amount comprises controlling a motor configured to rotate the upper body about the axis that is perpendicular to the angle of transection by the first amount.

15. The computer-implemented method of claim 13, wherein rotating the lower body about the axis that is perpendicular to the bottom edge of the lower body and that passes through the center of the lower body by the second amount comprises controlling a motor configured to rotate the lower body about the axis that is perpendicular to the bottom edge of the lower body and that passes through the center of the lower body by the second amount.

16. The computer-implemented method of claim 13, wherein receiving the data specifying the amount to tilt the pan and tilt camera comprises:
  receiving data specifying an angle; and
  determining the amount to tilt the pan and tilt camera based on the tilt position of the pan and tilt camera and the specified angle.

17. The computer-implemented method of claim 13, comprising:
  receiving data specifying an amount to pan the pan and tilt camera;
  determining, based at least on the specified amount and the second amount, a third amount to rotate the lower body about the axis that is perpendicular to the bottom edge of the lower body and that passes through the center of the lower body; and
  rotating the lower body about the axis that is perpendicular to the bottom edge of the lower body and that passes through the center of the lower body by the third amount to pan the pan and tilt camera by the specified amount.

18. The computer-implemented method of claim 17, wherein receiving data specifying the amount to pan the pan and tilt comprises:
  receiving data specifying an angular position of the cylindrical housing with respect to the axis that is perpendicular to the bottom edge of the lower body and that passes through the center of the lower body; and
  determining the amount to pan the pan and tilt camera based on the pan position of the pan and tilt camera and the specified angular position of the cylindrical housing with respect to the axis that is perpendicular to the bottom edge of the lower body and that passes through the center of the lower body.

19. The computer-implemented method of claim 13, wherein rotating the upper body about the axis that is perpendicular to the angle of transection by the first amount and rotating the lower body about the axis that is perpendicular to the bottom edge of the lower body and that passes through the center of the lower body by the second amount does not affect an orientation of the camera component with respect to an axis that parallel to the bottom edge of the lower body.

20. The computer-implemented method of claim 13, comprising:
   determining, based at least on the tilt position and the data specifying the amount to tilt the pan and tilt camera, that the amount to tilt the pan and tilt camera does not satisfy a range of possible amounts to tilt the pan and tilt camera; and
   providing information indicating that the specified amount to tilt the pan and tilt camera does not satisfy the range of possible amounts to tilt the pan and tilt camera.

\* \* \* \* \*